United States Patent [19]

Kaye

[11] Patent Number: 4,570,674
[45] Date of Patent: Feb. 18, 1986

[54] MECHANICALLY PROGRAMMABLE-SEQUENCING VALVE
[75] Inventor: Peter D. Kaye, Monroe, Oreg.
[73] Assignee: Bell Industries, Inc., Eugene, Oreg.
[21] Appl. No.: 582,951
[22] Filed: Feb. 23, 1984
[51] Int. Cl.$^4$ .............................................. F15B 21/02
[52] U.S. Cl. ................................ 137/624.18; 137/884
[58] Field of Search ................ 137/624.18, 624.2, 884; 91/36

[56] References Cited

U.S. PATENT DOCUMENTS

| | | | |
|---|---|---|---|
| 3,244,193 | 4/1966 | Loveless | 137/884 X |
| 3,495,500 | 2/1970 | Valyi | 91/36 |
| 4,004,497 | 1/1977 | Scholin | 137/624.18 X |
| 4,321,947 | 3/1982 | Cech | 137/624.2 X |

Primary Examiner—Alan Cohan
Attorney, Agent, or Firm—Kolisch, Hartwell & Dickinson

[57] ABSTRACT

A programmable-sequencing valve assembly for controlling plural fluid-operated motors, which includes a series of valve housing modules, sealably joined to one another thereby forming an elongate valve housing which receives plural valve inserts. The valve housing modules collectively form manifolds which may be connected to a pressurized source of fluid and an exhaust line. The assembly is mechanically programmable and provides a visible, non-volatile program to control multiple motors. Individual valves are actuated by cam-operated rocker arms. A cam shaft includes removable adjustable cams, a program may be quickly changed by replacing or rearranging the shaft, its associated cams, or nodules on the cams.

6 Claims, 5 Drawing Figures

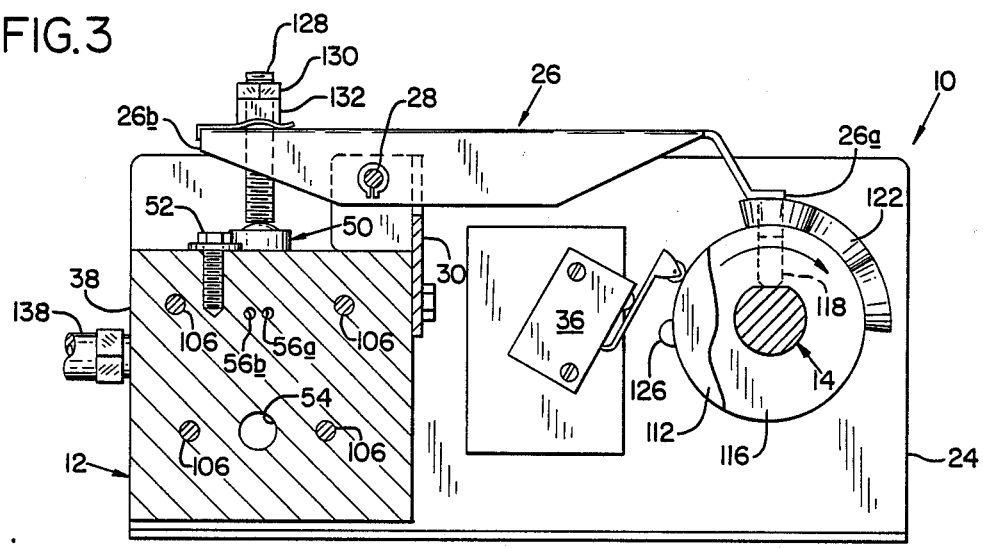
FIG. 3
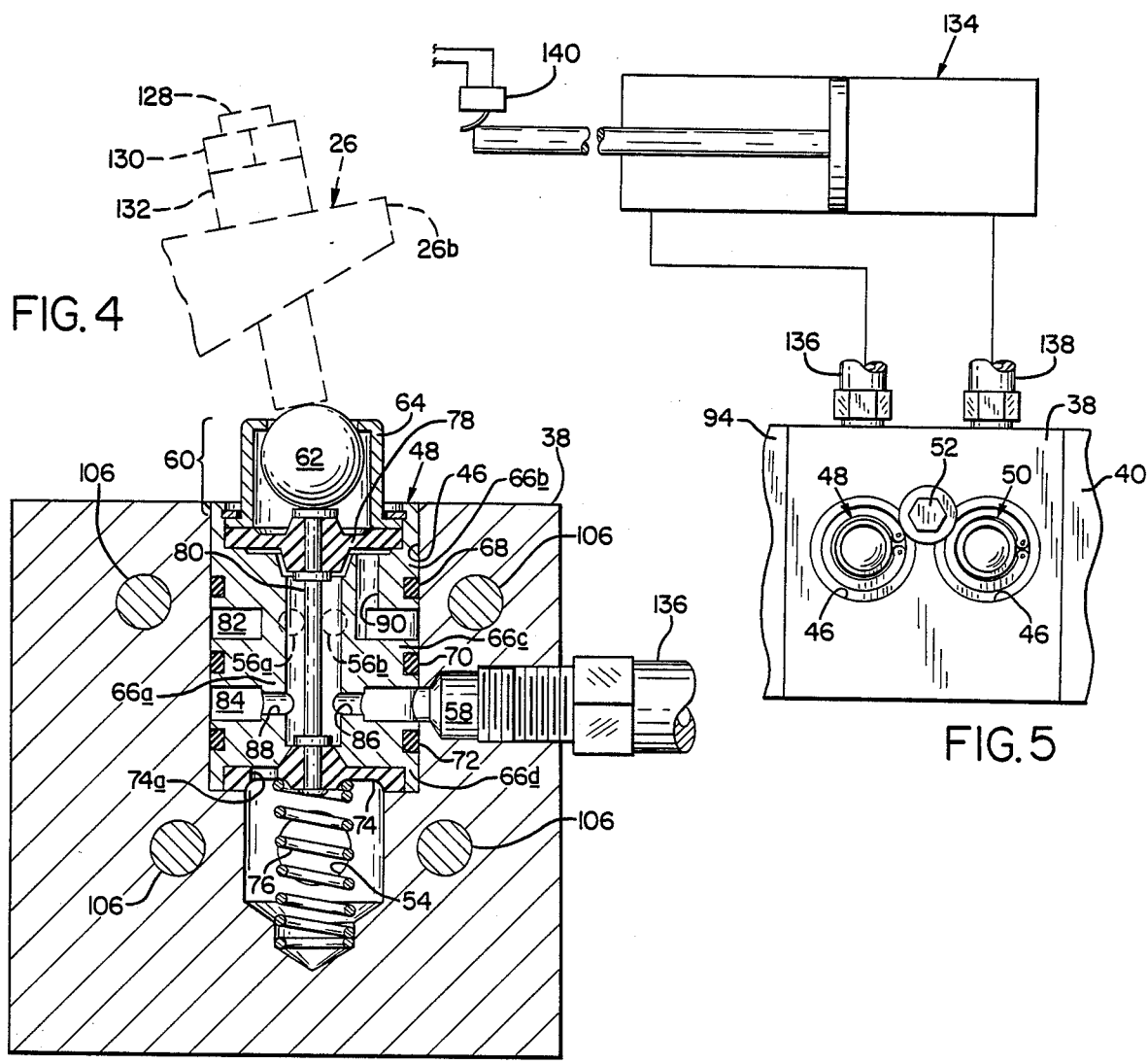
FIG. 4
FIG. 5

MECHANICALLY PROGRAMMABLE-SEQUENCING VALVE

BACKGROUND AND SUMMARY OF THE INVENTION

The instant invention pertains to a programmable-sequencing valve assembly for controlling fluid-operated motors.

Industrial robotic devices which are actuated by multiple motors generally require some form of remote control. In the case of hydraulically operated robotic devices, known remote controllers have taken several forms. One form of remote controller is a solenoid-operated valving arrangement. A solenoid-operated valving arrangement may be hard-wired, with electronic circuitry comprising limit switches and relays, and may include some form of electronic logic means. Another known form of remote controller combines solenoid-actuated valve assemblies with a program-driven computer.

For a variety of reasons, the known forms of robotic control suffer certain disadvantages when implemented. Solenoid-operated valves generally do not have a fast enough fluid flow, or do not operate under a sufficiently high fluid pressure, to provide adequate control to remote robotic devices. Solenoid-operated valves that do operate with sufficiently high pressure and fast fluid flow are very costly. Additionally, the use of solenoid-actuated hydraulic valves generally requires complex plumbing, which includes numerous sharp bends in the hydraulic lines connecting the valves to a robotic device. This lowers efficiency.

Control of known valving arrangements with hard-wired systems requires complex wiring which is difficult to re-program and de-bug. Soft-wired, or programmable systems, offer flexibility and ease of re-programming and de-bugging, but require highly skilled personnel to program and maintain. These systems may be subject to voltage spikes, electrical noise, vibration and other electromagnetic disturbances, which can result in a "program crash".

Additionally, known control valves are designed and made to operate with a single fluid type. Thus, different structures are required to provide fluid control in the case of a hydraulic system, then are needed, for instances, with air, or water.

An object of the instant invention is to provide a user-programmable-sequencing valve assembly.

Another object of the instant invention is to provide a programmable-sequencing valve assembly which has a visible programming sequence and monitoring capability.

A further object of the instant invention is to provide a sequencing valve assembly which utilizes a non-volatile, mechanical program.

Yet another object of the instant invention is to provide a valve assembly which includes a valve housing with in place manifolds produced by joining together valve housing modules.

A further object of the instant invention is to provide a programmable-sequencing valve assembly for multiple motor control which has a high fluid flow capacity, and can carry fluid under high pressure.

Another object of the instant invention is to provide a programmable-sequencing valve assembly which does not require extensive sharp-angle bending in fluid lines between the assembly and remotely controlled motors.

Yet another object of the instant invention is to provide a programmable-sequencing valve assembly which may operate with a variety of fluids.

The device of the instant invention is a user-programmable-sequencing valve assembly, which includes an elongate valve housing made up of valve housing modules. The housing contains a plurality of valve cartridge-receiving wells, in which are received a plurality of valve cartridges or inserts. An elongate cam shaft, which has a series of cams detachably mounted and disposed along its length, is positioned adjacent the housing. The cams carry selectably adjustable nodules which are mechanically programmable, and, coacting with an array of rocker arms, sequentially open and close valve gates which are part of the valve inserts. A motor and gear reduction unit are provided to advance the cam shaft and the cams mounted thereon. Electrical circuitry is provided to sense the rotational displacement of the cam shaft and the position of controlled remote motors, and this circuitry produces sequential advance of the cam shaft.

The device may be adapted to handle a variety of fluids by selecting appropriate fluid-resistant sealing material.

These and other objects and advantages of the instant invention will become more fully apparent as the description which follows is read with reference to the accompanying drawings.

DESCRIPTION OF THE DRAWINGS

FIG. 3 is an end view of the valve assembly, with portions broken away, taken generally along the line 3—3 in FIG. 1.

FIG. 4 is a median section through a housing module showing a cartridge-receiving well, and a valve cartridge or insert, taken generally along the line 4—4 in FIG. 2.

FIG. 5 is a greatly simplified schematic view of a housing module connected to a double-acting fluid driven ram.

DETAILED DESCRIPTION OF A PREFERRED EMBODIMENT

Figure 1:
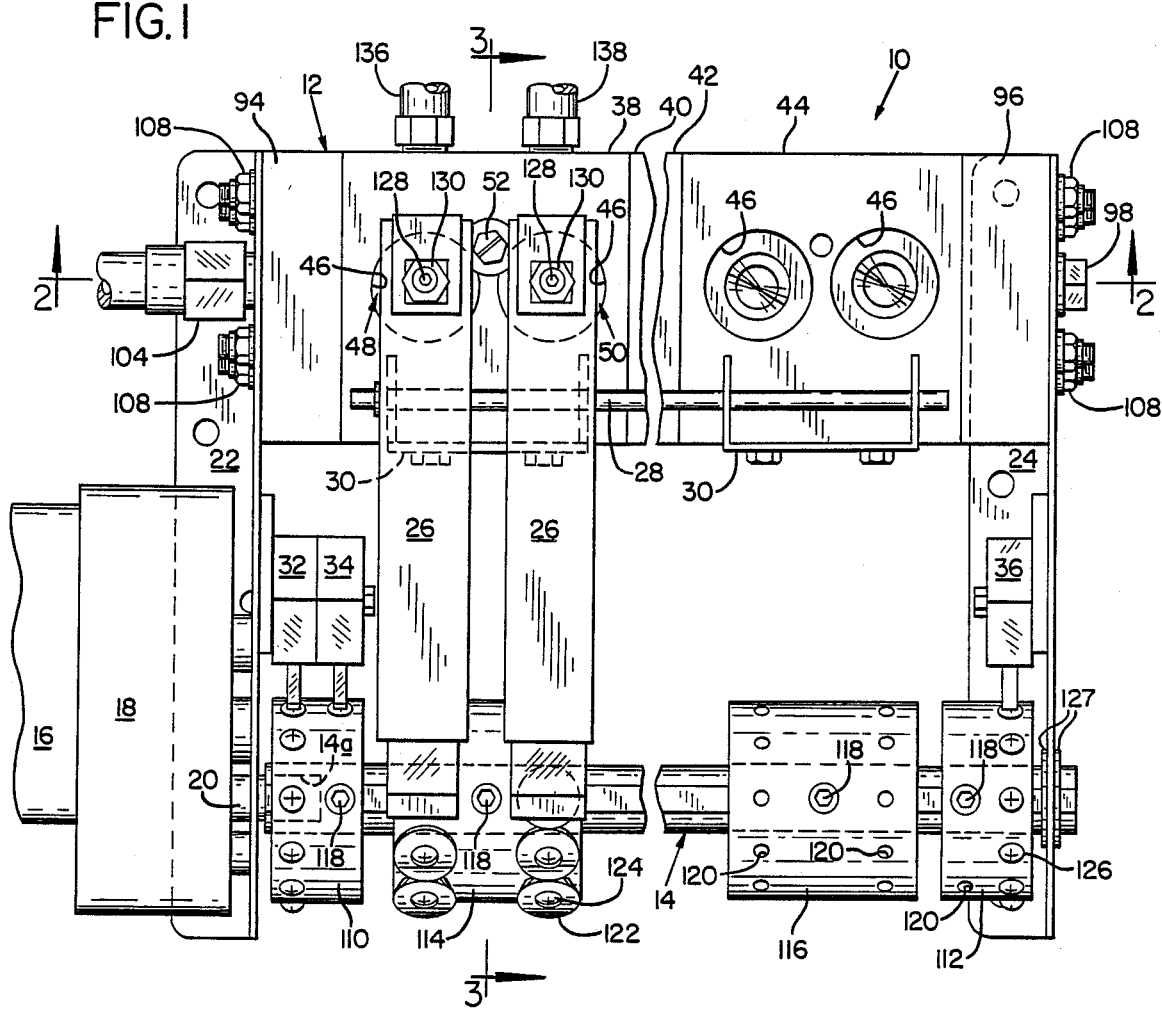
FIG. 1 is a front elevation of a programmable-sequencing valve assembly constructed according to the instant invention.

Turning now to the drawings, particularly with reference to FIG. 1, a programmable-sequencing valve assembly constructed according to the instant invention is shown generally at 10. The assembly includes an elongate valve housing, shown generally at 12, and an elongate cam shaft 14.

Shaft 14 is sequentially advanced by a motor 16, also referred to herein as motor means, acting through a gear box 18 which includes a drive shaft 20. Cam shaft 14 has an internally threaded cam shaft socket 14a receiving the threaded end of drive shaft 20.

Housing 12 and shaft 14 are held relative one another by a frame, which includes a left frame element 22 and a right frame element 24.

An array of rocker arms is operatively disposed between the cams and the valve housing. In this array, are a set of identical rocker arms, as exemplified by rocker arm 26. These are pivotably mounted on a rocker arm shaft 28 which is held in place by a series of rocker arm shaft supports, one of which is shown at 30.

Also shown in FIG. 1 are three program limit switches, 32, 34 and 36. The three switches are referred to herein collectively as rotation sensor means.

Housing 12 is formed of plural housing modules, shown at 38, 40, 42 and 44. These modules are essentially all the same. It should be understood that while only four modules are shown in FIGS. 1 and 2, an important feature of the invention is the ability to form a valve housing with as many modules as is required to perform a particular function.

In the preferred embodiment, each housing module contains two identical valve cartridge or valve insert receiving wells, 46. A valve cartridge or insert 48, 50 is received within the wells. An insert retaining screw, shown at 52 holds two inserts in place in each housing module.

Figure 2:
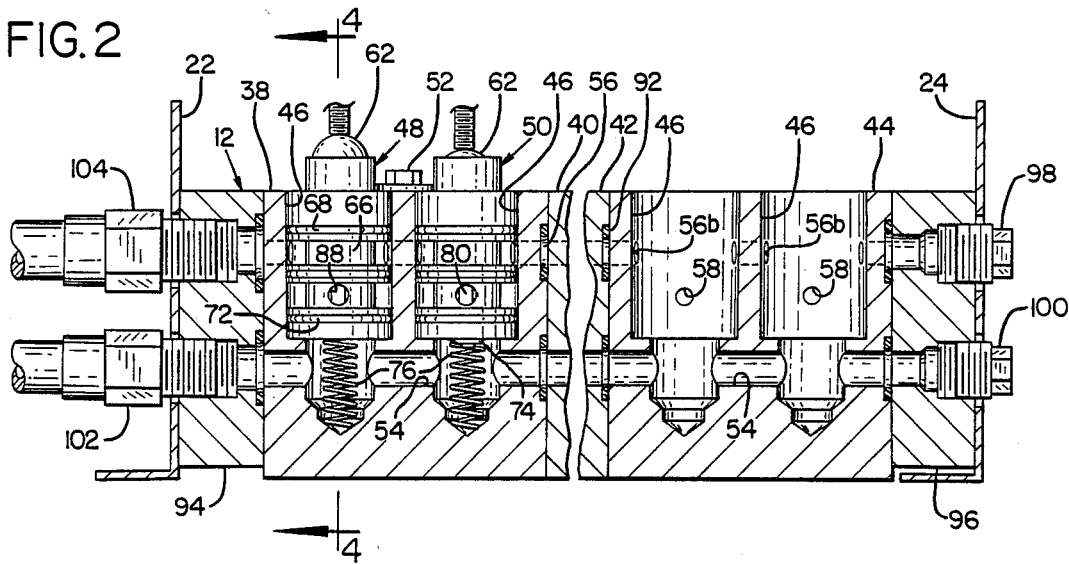
FIG. 2 is a median section through a valve housing constructed according to the instant invention, with portions broken away to show detail, taken generally along the line 2—2 in FIG. 1.

Referring now to FIG. 2, the wells in module 44 are depicted without inserts in place. Module 44 contains a first fluid passage segment 54 which extends completely therethrough and intersects the two wells in the module. A second fluid passage segment extends entirely through the housing module, which at the ends of the module is a single channel 56 and which divides between the ends of the module into a pair of channels 56a, 56b (FIG. 4). Fluid passage 56 also intersects the two wells. An actuator fluid passage 58, extends inward from the side of the housing module to connect with each well in the module.

Turning now to FIG. 4, an insert, such as insert 48 includes an actuator, shown generally at 60. In the preferred embodiment, actuator 60 includes an actuating ball 62, which is contained within a retainer 64. Insert 48 further includes an insert body 66. Body 66 includes a hollow cylindrical core 66a. Integrally formed about the outside of the body are three radially projecting annular flanges 66b, 66c and 66d. Each flange carries an O-ring on its periphery, such as those shown at 68, 70 and 72.

A valve gate is located at either end of cylindrical core 66a. One of these is an intake valve gate 74, located at what is referred to herein as an intake end of the valve insert. In the preferred embodiment, the gate is a substantially disc-shaped seal with a thickened center portion which has ports, such as the one shown at 74a, which allows fluid to pass through the seal into cylindrical core 66a. The thickened central portion, acts as a plug at the intake end of core 66a and is biased by a spring, also referred to herein as biasing means, 76, to a normally closed position. An exhaust valve gate 78, is located at the end of valve insert 48 opposite gate 74. Gate 78 is substantially disc-shaped with a thickened central portion, and is connected with gate 74 by means of a valve gate connecting rod 80. Gate 78 is thus normally biased to an open position.

When insert 48 is inserted in well 46, the flanges cooperate with the well to form two open toroidal areas, shown at 82 and 84. Area 84 communicates with the interior of core 66a by means of two ports, shown at 86 and 88. Area 82 connects with the interior of body 66 by means of a port 90 which is formed in flange 66b. When the valve insert is in its normally closed (depicted in FIG. 4), or first, resting position, fluid may freely flow between areas 82 and 84, through the hollow core and ports 86, 88 and 90. Area 82 communicates with fluid passage segment 56, and area 84 communicates with actuator fluid passage 58. Thus, fluid may flow between passage segment 56 and an actuator fluid passage when the gates of a valve insert are in their resting position. The valve insert gates are adjustable to a second position where gate 78 closes and gate 74 opens. In this second, or actuated position, fluid may flow from passage segment 54 through port 74a into core 66a and then through ports 86 and 88 to actuator fluid passage 58.

An important feature of the invention is the modular construction of both the valve housing and cam assembly.

As depicted in FIGS. 1 and 2, multiple housing modules may be joined together to form a unitary valve housing assembly. The housing modules when so joined are sealed to each other by means of O-ring seals, like that shown at 92 in FIG. 2.

When so assembled, passage segments 54 in the various housing modules interconnect with each other to form one continuous manifold extending the length of the housing module assembly. Similarly, passage segments 56 in the various modules interconnect with each other to form another continuous manifold extending the length of the assembly. In a typical installation, one manifold handles fluid under pressure whereas the other manifold handles exhaust fluid. In the embodiment of the invention herein described the manifold formed by passage segments 54 comprises a pressure fluid manifold and the manifold formed by passage segments 56 comprises an exhaust fluid manifold.

To complete the housing assembly, end pieces such as those shown at 94, 96 are placed against the ends of the valve housing modules appearing at the end of the assembled group. These end pieces are provided with a pair of tapped ports. These ports may be provided with fittings or with plugs whereby each manifold formed by the assembly of housing modules has a plugged end and an end which provides for fluid passage therethrough. As illustrated in FIG. 2, plugs 98, 100 close off the ends of the exhaust and pressure fluid manifold, respectively, at the right end of the assembly. A fitting 102, is inserted in a port in end piece 92 connecting to the pressure manifold formed by the segments 54 and is employed to connect the source of pressure fluid to the valve assembly. Fitting 104 connecting with the other of the tapped ports is employed to connect the manifold formed by segments 56 with a reservoir for exhausted fluid.

Holding the housing modules and the end pieces described together as a complete unit together with frame elements 22 and 24 are four shafts 106 which extend through the assembly, and suitable bores accommodating the shafts, and nuts 108 screwed onto the threaded exposed ends of these shafts.

Referring now to FIG. 1, a series of cam carriers are mounted on, and disposed at intervals along the length of shaft 14. In the preferred embodiment, there are two types of carriers mounted on shaft 14. The first type of carrier is a switch cam carrier, two of which are depicted at 110 and 112. The second type of carrier is a valve cam carrier. Two such carriers are depicted at 114 and 116. All of the carriers are detachably mounted on cam shaft 14, as by screws 118. Shaft 14 and its associated carriers may be removed and replaced as a unit.

The cam carriers are assembled into completed cams by securing detachable cam nodules at appropriate positions on the outside of the carriers. Thus, carrier 116 is shown provided with two rows of tapped bores 120 extending about its periphery. A cam nodule is shown at 122. To detachably secure such to the outside of the cam carrier, a fastener, such as screw 124, is utilized which extends through an accommodating bore in the nodule thence to be screwed into the appropriate tapped bore of the cam carrier. The carrier together with the nodules mounted thereon constitute a cam. The number of nodules secured to a carrier and the position of such nodules on the carrier is determined by the control functions desired to be performed by the completed cam with rotation of the cam under the rocker arms associated therewith. The ability to change the number and positions of the nodules in the various cams renders the valve assembly mechanically programmable.

The switch cam carriers also are provided with detachable cam nodules. As shown in the drawings these nodules take a slightly different form since they are not required to produce as much movement in a control switch as is desired to be produced in a rocker arm when producing a controlled function. Specifically, the nodules, and with reference to switch cam carrier 110 comprise the rounded ends of screws 126 projecting from the periphery of the carrier and detachably received within threaded bores similar to bores 120.

Obviously, other forms of detachable cam nodules may be employed than those specifically described herein.

Cam shaft 14 earlier has been described as having socket 14a at one end receiving the drive shaft extending from gear box 26. The opposite end of the cam shaft is suitably rotatably supported in frame element 24 by a bearing 127. To remove the cam assembly as a unit, the carriers on the cam shaft are loosened to permit axial movement along the cam shaft. Cam shaft 14 may then be disconnected from shaft 20 by turning the cam shaft to produce unscrewing of threaded socket 14a from the threaded end of shaft 20. In this manner, the entire cam assembly may be removed as a unit. This feature permits an entire program to be changed relatively rapidly by replacement of a removed cam assembly with a replacement assembly having carriers and a nodule arrangement comporting with the type of control functions desired.

Considering the construction of a rocker arm, and referring to FIG. 3 and rocker arm 26 therein shown, at the bottom of the arm is an end 26a which rides on a cam to be deflected as a cam nodule moves thereunder. At the other end 26b of the rocker arm is a set screw 128 secured in place by two locking nuts 130, 132. An end of this set screw is positioned adjacent the actuator of valve insert 50. With movement of the set screw and end 26b of the arm against the actuator, the valve insert associated therewith is adjusted to place the mechanism thereof in the second position earlier described for the insert. With end 26a of the rocker arm moving off a cam nodule, spring 76 earlier described biases the actuator in FIG. 3 to produce movement of end 26b of the rocker arm and shifting of the valve mechanism in the insert to its first position.

Actuator fluid passages 58, have been earlier described, which connect with the insert-receiving wells provided in a valve housing module. As can be seen in FIG. 4 the outer end of each of these passages is enlarged and tapped to receive the threaded end of a fitting. In a typical installation, each valve insert may be utilized as a three-way valve controlling the supply and exhaust of pressure fluid to a fluid motor, such as a double-acting fluid operated ram. Thus, and with a valve module operating in this manner, and referring to FIG. 5, one end of a fluid operated ram 134 is connected by tubing 136 and a suitable fitting to actuator fluid passage 58 in module 38 of the valve assembly associated with insert 48. The opposite end of the ram is connected through tubing 138 to actuator passage 58 in the module of the valve assembly associated with insert 50. The nodules on the cam controlling the rocker arms for the two valve inserts in this module are arranged so that when valve insert 48 is adjusted to its second position valve insert 50 is adjusted to its first position and with valve insert 50 adjusted to its second position valve insert 48 is adjusted to its first position. With this organization and with valve insert 48 in its first position, passage 58 connects with the exhaust manifold with exhaust thus provided the left end of ram 134 illustrated in FIG. 5. Valve insert 50 being in its second position, passage 58 is connected by the valve insert to the pressure fluid manifold with pressure fluid then being introduced to the right end of ram 134. Reversing the adjusted positions of valve inserts 48, 50, results in pressure fluid being provided through conduit 136 to the left end of ram 134 and the provision for the exhaust of fluid from the right end of the ram to valve insert 50 to the exhaust manifold.

From the above description, it can be seen that the various modules in the valve assembly may be employed collectively to control the supply and exhaust to a multiplicity of double-acting fluid operated rams with the particular condition of an individual ram controlled by the assembly being determined by which end of the ram is being supplied with pressure fluid and which end of the rams is provided an exhaust.

To produce sequential and controlled adjustments of multiplicity of rams, cam shaft 14 is turned by motor 16 and gear box 18 to an extent determined by a motor control means including program limit switches 32, 34, and 36, operating normally in conjunction with other switches, such as switch 140, referred to herein as device sensor means, which may indicate, for instance, whether adjusted positions have been attained in instrumentalities moved under power by the various fluid-operated motors controlled by the valve assembly. A detailed description of the switching instrumentalities employed to produce step-wise advancement of the cam shaft under operation of motor 16 is not believed necessary to an understanding of this invention.

The particular type of switching arrangement employed and the placement and interplay of various switches obviously is subject to a wide degree of variation depending upon the work operations being controlled, the number of fluid operated motors producing such work operations and the specific type of operation desired. Sufficient to say however, program limit switch 32 may be employed to initiate operation of motor 16 with this switch resting on a cam nodule and upon a signal being received from a remote station, which may be an on/off signal, or a signal from a limit switch such as switch 140, seeking initiation of motor operation through switch 36. With the motor started and with a holding relay closed, the motor might continue to run until switch 32 is actuated by engaging another cam nodule. Program limit switch 34 may be employed in the circuitry to produce a homing function causing motor 16 to remain actuated upon excitation by suitable circuitry until a home position for the cam shaft 14 is reached which is determined by switch 34. Switch 36 might be a filter switch preventing input of an unwanted signal in remote control circuitry from controlling motor operation.

As will be apparent from the above, the programmable-sequencing valve assembly of the invention includes means for producing sequence actuation of a multiplicity of fluid operated motors as well as cam control switching functions produced as the result of step-wise rotation of cam shaft 14.

With the valve assembly of the invention it is easy visibly to observe the progress of a program selected for the assembly and to observe sequential and successive actuation of the various modules in the valve assembly performing according to the particular program selected. Hydraulic lines running between the valve assembly and remotely located hydraulic motors are relatively easily traced. Mistiming and correction of movement or actuation of remotely located motors are relatively easily observed and corrected.

The valve assembly is constructed to handle a relatively large volume of pressure fluid. Unlike solenoid-operated control devices there is no requirement for elbows and T-fittings which introduce expense and losses of efficiency.

The valve assembly obviously is very flexible with the work functions performed by the assembly being determined by the number of modules in the assembly and being expanded for instance to meet a given situation by increasing the number of valve modules present in the assembly.

With the visibility afforded by the valve assembly, maintenance and repairs are greatly simplified.

Although a preferred embodiment of the invention has been described, it should be appreciated that changes and modifications may be made to the device without departing from the spirit of the invention.

It is claimed and desired to secure by Letters Patent:

1. A programmable sequencing valve assembly for controlling fluid flow to a remote device, comprising
an elongate cam shaft,
a series of cams mounted on and disposed at intervals along the length of the shaft,
an elongate valve housing disposed with a major axis substantially parallel to, and located to one side of, said cam shaft, said housing including a series of housing modules disposed side-by-side and said modules being sealably joined one to another, each housing module including a first fluid passage segment and a second fluid passage segment extending therethrough, the first fluid passage segments of the various modules connecting with each other to form one manifold and the second fluid passage segments of the various modules connecting with each other to form another manifold, each housing module further having an actuator passage,
an array of rocker arms with one rocker arm for each cam, mounted with one set of ends in position to be actuated by the cams and another set of ends disposed along said housing,
at least one valve insert mounted in each housing module and the inserts of the housing modules having means coacting with said rocker arms actuating the valve inserts, each valve insert controlling flow between the manifolds and the actuator passage,
said rocker arms being exteriorly disposed on said housing, and
motor means for advancing said cam shaft.

2. The assembly of claim 1, which further includes motor control means producing intermittent operation of said motor means, said motor control means including cam shaft rotation sensor means and device sensor means for sensing the position of a controlled device, said rotation sensor means and said device sensor means being operably interconnected to produce intermittent operation of said motor means.

3. The assembly of claim 1, wherein each housing module is provided with at least one well which intercepts said manifolds, the actuator fluid passage of a module communicates with the well of the module, the valve insert for a housing module is mounted in the well of the module, and each valve insert including a pair of valve gates controlled by the valve assembly to selectively connect said manifolds with said actuator passage.

4. A programmable-sequencing valve assembly for controlling line-flow to a remote device, comprising
an elongate cam shaft,
a series of cams mounted on and disposed in a row along the length of the shaft,
an elongate valve housing disposed with a major axis substantially parallel to and located to one side of said cam shaft, said housing including a series of housing modules, each containing a first and a second fluid passage segment and an actuator fluid passage, said housing modules being sealably joined to one another with said first fluid passage segments in said modules connecting with each other to form a first manifold and with said second fluid passage segments of the modules connecting with each other to form a second manifold,
an array of rocker arms with at least one rocker arm for each cam, mounted with one set of ends of the arms positioned to be actuated by the cams and another set of ends disposed along said housing,
a well in each of said housing modules and a valve insert mounted in each well, each valve insert having an actuator for actuating the valve insert and the actuators of the various valve inserts being exteriorly disposed along the length of the valve housing adapted to be acted upon by said other set of ends of said rocker arms,
each of said valve inserts having a resting position connecting said actuator fluid passage with said second manifold and an actuated position connecting said actuator fluid passage with said first manifold, each valve insert further including biasing means operable to bias the assembly to its said resting position, actuation of the valve actuator by a rocker arm producing adjustment of a valve assembly to its actuated position, and
motor means for sequentially advancing said cam shaft.

5. The assembly of claim 4, wherein said cams are detachably mounted on said cam shaft, and the sequencing of valves is accomplished by selectably adjustable nodules operably installed on and removable from said cams.

6. The assembly of claim 4, which further includes motor control means for producing intermittent operation of said motor means, said motor control means including cam shaft rotation sensor means and device sensor means for sensing the position of a controlled device.

* * * * *